US012584816B2

(12) United States Patent
O'Brien et al.

(10) Patent No.: US 12,584,816 B2
(45) Date of Patent: **\*Mar. 24, 2026**

(54) DETERMINING GATE STATE AND REMEDIAL MEASURES USING GATE SENSOR ATTACHMENT

(71) Applicant: Metropolis IP Holdings, LLC, Santa Monica, CA (US)

(72) Inventors: Barry James O'Brien, Seattle, WA (US); Leah Sardone, Seattle, WA (US); Zachary James Thompson, Seattle, WA (US); Kyle Bradley Kufalk, DeForest, WI (US); Luis Felipe Rodriguez Herrera, Brooklyn, NY (US); Antonio Ortega, Tucker, GA (US); Alexander David Israel, Los Angeles, CA (US)

(73) Assignee: Metropolis IP Holdings, LLC, Santa Monica, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/824,741

(22) Filed: Sep. 4, 2024

(65) Prior Publication Data

US 2025/0003827 A1 Jan. 2, 2025

Related U.S. Application Data

(63) Continuation of application No. 18/178,477, filed on Mar. 3, 2023, now Pat. No. 12,123,809.

(51) Int. Cl.
*G01M 5/00* (2006.01)
*G06N 5/022* (2023.01)

(52) U.S. Cl.
CPC ........ *G01M 5/0025* (2013.01); *G01M 5/0033* (2013.01); *G01M 5/0066* (2013.01); *G06N 5/022* (2013.01)

(58) Field of Classification Search
CPC ............. G01M 5/0025; G01M 5/0033; G01M 5/0066; G06N 5/022
See application file for complete search history.

(56) References Cited

U.S. PATENT DOCUMENTS

| | | | |
|---|---|---|---|
| 6,091,217 A | 7/2000 | Parsadayan | |
| 9,286,799 B2 | 3/2016 | Christianson et al. | |
| 11,851,936 B2 | 12/2023 | Cate et al. | |
| 2005/0156546 A1 | 7/2005 | Keller et al. | |
| 2006/0157206 A1 | 7/2006 | Weik et al. | |

(Continued)

OTHER PUBLICATIONS

PCT International Search Report and Written Opinion, PCT Application No. PCT/US 24/17895, May 17, 2024, 13 pages.

*Primary Examiner* — Nay Tun
(74) *Attorney, Agent, or Firm* — Fenwick & West LLP

(57) ABSTRACT

An edge device receives sensor data from a sensor affixed to a moveable gate. The edge device determines the positional state of the moveable gate based on the sensor data by inputting the received data into a machine learning model or by comparing the sensor data to values associated with a positional state through a calibration process. The edge device stores a log that associates the positional state and sensor data. The edge device determines the health state of the moveable gate using a machine learning model that is trained to predict, based on input of a new log, the health state of the gate. Responsive to determining that the health state of the gate is unhealthy, the edge device triggers a remedial action.

20 Claims, 10 Drawing Sheets

(56) References Cited

U.S. PATENT DOCUMENTS

| 2014/0125499 | A1 | 5/2014 | Cate et al. |
| 2018/0119476 | A1 | 5/2018 | Quaiser |
| 2018/0347250 | A1 | 12/2018 | Null et al. |

Receive sensor data from sensor affixed to moveable gate 510

Determine positional state of gate 520

Store log that associates positional state and sensor data 530

Determine health state 540

Determine whether health state is unhealthy 550

Responsive to determining health state is unhealthy, trigger remedial action 560

DETERMINING GATE STATE AND REMEDIAL MEASURES USING GATE SENSOR ATTACHMENT

CROSS REFERENCE TO RELATED APPLICATIONS

This application is a continuation of U.S. application Ser. No. 18/178,477, filed Mar. 3, 2023, now U.S. Pat. No. 12,123,809, which is incorporated by reference in its entirety.

TECHNICAL FIELD

The disclosure generally relates to the field of machine learning, and more particularly relates to multi-dimensional state classification of a device.

BACKGROUND

Parking facilities employ gates to manage the use of their space, often requiring vehicles to pass through a gate upon one or more of entry and exit. As many parking facilities employ autonomous gates that are fully automated, human awareness cannot be relied upon to ensure that gates are properly in operation at all times. In particular, it may be difficult for the parking facility to determine when the gate is broken or in need of repairs, which could result in various problems, such as safety issues where unwanted vehicles enter, or where a broken exit gate blocks drivers from exiting the facility.

SUMMARY

Systems and methods are disclosed herein to autonomously determine the state of a parking gate with a sensor and determine remedial measures. An edge device is populated at a parking facility that receives sensor data from a sensor affixed to a moveable gate. The edge device determines the positional state of the moveable gate based on the sensor data by inputting the received data into a machine learning model or by comparing the sensor data to values associated with a positional state through a calibration process (e.g., using camera or magnet data). The edge device stores a log that associates the positional state and sensor data. The edge device determines the health state of the moveable gate using a machine learning model that is trained to predict, based on input of a new log, the health state of the gate. Responsive to determining that the health state of the gate is unhealthy, the edge device triggers a remedial action, such as alerting an operator or administrator associated with the parking facility, transmitting a communication to drivers, or modifying a physical aspect of the parking facility, such as a status light of the gate.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Figure 1:
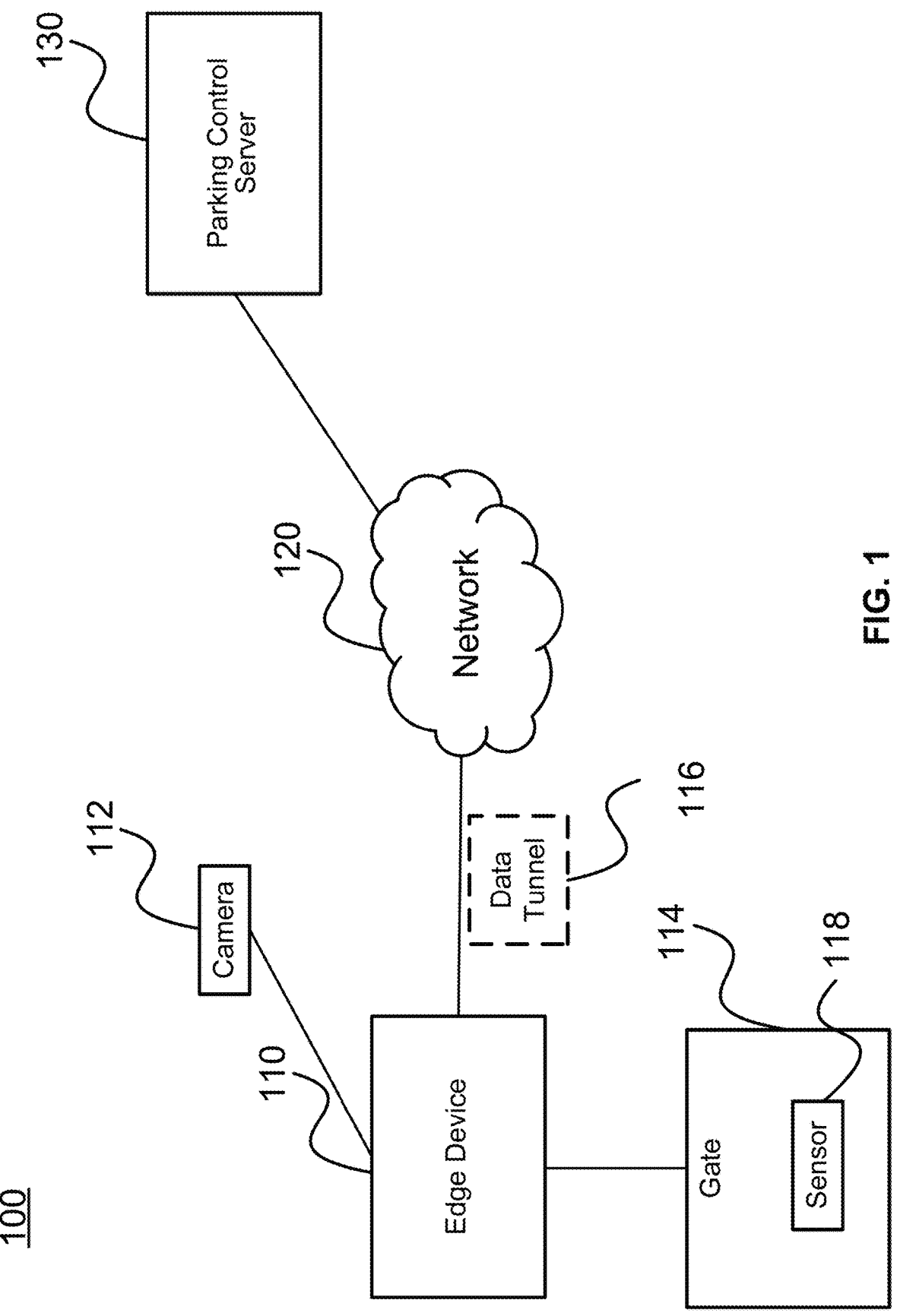
FIG. 1 illustrates one embodiment of a system environment for determining gate state using an edge device and a parking control server.

FIG. 1 illustrates one embodiment of a system environment for seamless parking gate operation using an edge device and a parking control server. As depicted in FIG. 1, environment 100 includes edge device 110, camera 112, gate 114, data tunnel 116, sensor 118, network 120, and parking control server 130. While only one of each feature of environment is depicted, this is for convenience only, and any number of each feature may be present. Where a singular article is used to address these features (e.g., "camera 112"), scenarios where multiples of those features are referenced are within the scope of what is disclosed (e.g., a reference to "camera 112" may mean that multiple cameras are involved).

Edge device 110 detects a vehicle approaching gate 114 using camera 112. Edge device 110, upon detecting such a vehicle, performs various operations (e.g., lift the gate; update a profile associated with the vehicle, etc.) that are described in further detail below with reference to at least FIG. 2. Camera 112 may include any number of cameras that capture images and/or video of a vehicle from one or more angles (e.g., from behind a vehicle, from in front of a vehicle, from the sides of a vehicle, etc.). Camera 112 may be in a fixed position or may be movable (e.g., along a track or line) to capture images and/or video from different angles. Where the term image is used, this may be a standalone image or may be a frame of a video. Where the term video is used, this may include a plurality of images (e.g., frames of the video), and the plurality of images may form a sequence that together form the video.

Edge device 110 also determines the health of gate 114 using a gate sensor attachment. A gate's health is a measure of the gate's ability to function. For example, a gate that moves slower may have a lower health than a gate that moves faster, or a gate that achieves a greater range of motion may have a higher health than a gate with a smaller range of motion. A gate sensor attachment is a sensor, such as sensor 118, attached to the gate that collects data about the gate's functioning. For example, sensor 118 may be an accelerometer or three axis accelerometer that detects the acceleration of the gate as it opens and closes. The sensor may be attached to any type of gate.

Gate 114 may be any object that blocks entry and/or exit from a facility (e.g., a parking facility) until moved. For example, gate 114 may be a pike that blocks entry or exit by standing parallel to the ground, and lifts perpendicular to the ground to allow a vehicle to pass. As another example, gate 114 may be a pole or a plurality of poles that block vehicle access until lowered to a position that is flush with the ground. Any form of blocking vehicle ingress/egress that is moveable to remove the block is within the context of gate 114. In some embodiments, no physical gate exists that blocks traffic from entering or exiting a facility. Rather, in such embodiments, gate 114 as referred to herein is a logical boundary between the inside and the outside of the facility, and all embodiments disclosed herein that refer to moving the gate equally refer to scenarios where a gate is not moved, but other processing occurs when an entry and exit match (e.g., record that the vehicle has left the facility). Yet further, gate 114 may be any generic gate that is not in direct communication with edge device 110. Edge device 110 may instead be in direct communication with a component that is separate from, but installed in association with, a gate, the component configured by installation to cause the gate to move.

Edge device 110 communicates information associated with a detected vehicle to parking control server 130 over network 120, optionally using data tunnel 116. Data tunnel 116 may be any tunneling mechanism, such as virtual private network (VPN). Network 120 may be any mode of communication, including cell tower communication, Internet communication, WiFi, WLAN, and so on. The information provided may include images of the detected vehicle. Additionally or alternatively, the information provided may include information extracted from or otherwise obtained based on the images of the detected vehicle (e.g., as described further below with respect to FIG. 2). Transmitting extracted information rather than the underlying images may result in bandwidth throughput efficiencies that enable real time or near-real-time movement of gate 114 by avoiding a need to transmit high data volume images.

Parking control server 130 receives the information from edge device 110 and performs operations based on that receipt. The operations may include storing the information, updating a profile, retrieving information related to the information, and communicating responsive additional information back to edge device 110. Parking control server 130 may control aspects of the parking facility, such as status lights above parking gates. The operations of parking control server 130 are described in further detail below with reference to at least FIG. 3.

Figure 2:
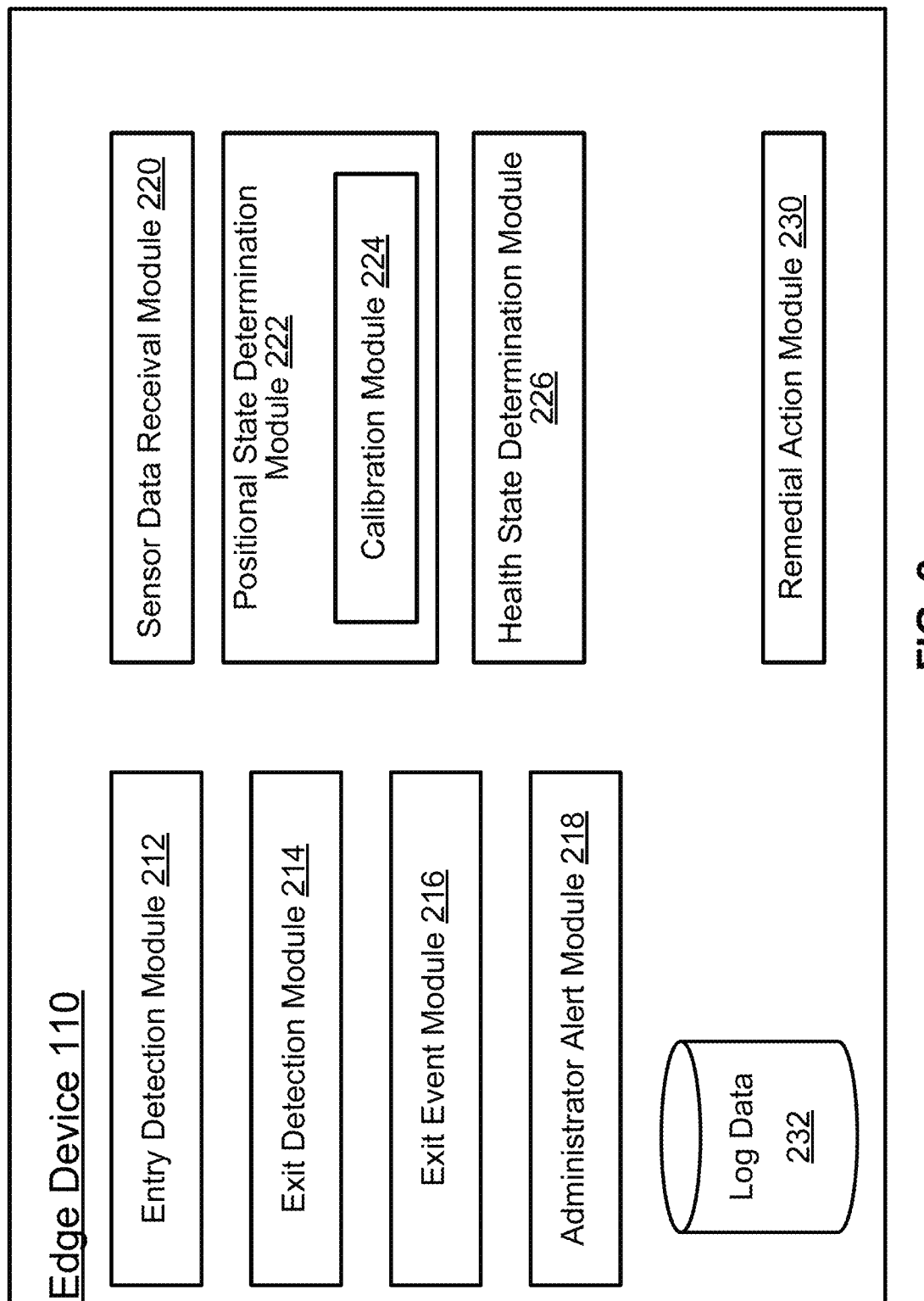
FIG. 2 illustrates one embodiment of exemplary modules operated by an edge device.

FIG. 2 illustrates one embodiment of exemplary modules operated by an edge device. As depicted in FIG. 2, edge device 110 includes entry detection module 212, exit detection module 214, exit event module 216, administrator alert module 218, sensor data receival module 220, positional state determination module 222, calibration module 224, health state determination module 226, remedial action module 230, and log data storage 232. The modules depicted with respect to edge device 110 are merely exemplary; fewer or additional modules may be used to achieve the activity disclosed herein. Moreover, the modules of edge device 110 typically reside in edge device 110, but in various embodiments may instead, in part or in whole, reside in parking control server 130 (e.g., where images, rather than data from images, are transmitted to parking control server 130 for processing). In some embodiments, the modules and functionality of edge device 110 may in whole or in part be implemented in sensor 118.

In an embodiment, entry detection module 212 captures a series of images over time. The images are received from camera 112. Camera 112 may continuously capture images, or may capture images when certain conditions are met (e.g., motion is detected, or any other heuristic such as during certain times of day). In an embodiment, edge device 110 may continuously receive images from camera 112 and may determine whether the images include a vehicle, in which case entry detection module 212 may perform processing on images that include a vehicle and discard other images. In an embodiment, entry detection module 212 may command camera 112 to only transmit images that include vehicles, and may perform processing on those received images. The captured images are in association with a moveable gate or logical boundary (e.g., gate 114), in that each camera 112 is either facing a gate or an area in a vicinity of a gate (e.g., just the entry side, just the exit side, or both). Each image may have a timestamp and/or a sequence number. Entry detection module 212 may associate all images that include a motion of a given vehicle from a time the vehicle enters the images until the time that the vehicle exits the images (e.g., during the time that the vehicle approaches the gate and then drives past the gate).

Entry detection module 212 may determine, for a vehicle approaching the entry side, from a subset of images of the series of images featuring the vehicle, a first data set. The first data set may include a plurality of parameters that describe attributes of the vehicle and a vehicle identifier of the vehicle. In an embodiment, a single machine learning model is used to produce the entire first data set. In another embodiment, a first machine learning model is used to determine the plurality of parameters, and a different second machine learning model is used to determine the vehicle identifier.

The term "plurality of the parameters of the vehicle," as used herein, may refer to a set of data that includes both identifying attributes of the vehicle and direction attributes of the vehicle. The term "identifying attributes of the vehicle" may include any information that is derivable from the images that describes the vehicle, such as make, model, color, type (e.g., sedan versus sports utility vehicle), height, length, bumper style, number of windows, door handle type, and any other descriptive features of the vehicle. The term "direction attributes of the vehicle" may refer to absolute direction (e.g., cardinal direction) or relative direction (e.g., direction of the vehicle relative to an entry gate and/or relative to an assigned direction of a lane which the entry gate blocks (e.g., where different gates are used for entry and exit lanes, and where a vehicle is approaching a gate from an entrance to a parking facility through an exit lane, the direction would be indicated as opposite to an intended direction of the lane)). The "direction attributes of the vehicle" may also be determined relative to a camera's imaging access, and are thus indicative of whether the vehicle is moving toward or away from the camera. The term "subset of images" refers to a set of images that includes the vehicle and excludes other images that do not include the vehicle.

In the two-model approach, entry detection module 212 inputs the subset of images into a first machine learning model, and receives, as output from the first machine learning model, the plurality of parameters, including the identifying attributes of the vehicle and the direction of the vehicle. In an embodiment, the output of the first machine learning model may be more granular, and may include a number of objects in an image (e.g., how many vehicles), types of objects in the image (e.g., vehicle type information, or per-vehicle identifying attribute information), result scores (e.g., confidence in each object classification), and bounding boxes (e.g., of sub-segments of the image for downstream processing, such as of a license plate for use by the second machine learning model). The first machine learning model may be trained to output the identifying attributes of the vehicle using example data having images of vehicles that are labeled with one or more candidate identifying attributes. For example, various images from cameras facing gates may be manually labeled by users to indicate the above-mentioned attributes, such as, for each of the various images, a make, model, color, type, and so on of a vehicle. The first machine learning model may be a supervised model that is trained using the example data to predict, for new images, their attributes.

The first machine learning model may be trained to output the direction attributes of the vehicle using example data, and/or to output data from which entry detection module 212 may determine some or all of the direction attributes. The example data may show motion of vehicles relative to one or more gates over a series of sequential frames, and may be annotated with a lane type (e.g., an entry lane versus an exit lane) and/or a gate type (e.g., exit gate versus entry gate), and may be labeled with a direction between two or more frames (e.g., toward an entry gate, away from an entry gate, toward an exit gate, away from an exit gate). Lane type may be derived by environmental factors (e.g., a model may be trained to recognize through enough example data that a direction past a gate that shows blue sky is an exit direction, and toward a halogen light is an entry direction). From this training, the first machine learning model may output direction directly based on learned motions relative to gate type and/or lane type, or may output lane type and/or gate type as well as indicia of directional movement, from which entry detection module 212 may apply heuristics to determine the direction attributes (e.g., toward entry gate, away from entry gate, toward exit gate, away from exit gate). That is, a direction vector along with a gate type and/or lane type may be output (e.g., environmental factors may be output along with the direction vector, which may include other information such as lighting, sky information, and so on), and the direction vector along with the environmental factors may be used to determine the direction attribute.

It is advantageous to determine direction along with identifying the vehicle, as vehicles are being tracked as they move and so identifying both direction and the vehicle itself in one step results in false positives. With that being said, a separate model could be used for vehicle detection and for direction detection, thus resulting in a three-model approach (two models being used for what above is referenced to as a "first machine learning model", each of those separate models trained separately using respective training data for each respective task.

Continuing on with the two-model approach, entry detection module 212 may determine a vehicle identifier of the vehicle by inputting images of the subset featuring a depiction of a license plate of the vehicle into a second machine learning model. That is, rather than using optical character recognition (OCR), a machine learning model may be used to decipher a license plate of a vehicle into a vehicle identifier. OCR methods are often inaccurate for license plate detection due to complexity of license plates, where different fonts (e.g., cursive versus script) are used, often against complex picture-filled backgrounds, different colors, and lighting issues. Moreover, various license plate types are difficult to accurately read because they often include slogans that are not generalizable. Even minor accuracies in OCR readings where one character or a geographical identifier determination is off could cause could result in an inability to effectively identify a vehicle.

To this end, the second machine learning model may be trained to identify both the geographical nomenclature and the string of characters of a vehicle identifier using training example images of license plates, where each of the training example images is labeled with its corresponding geographical nomenclature and string of characters. As used herein, the term "geographical nomenclature" may refer to a manner of identifying a jurisdiction that issued the license plate. That is, in the United States of America, an individual state would issue a license plate, and the geographical identifier would identify that state. In some jurisdictions, a country-wide license plate is issued, in which case the geographical identifier is an identifier of the country. A geographical identifier may identify more than one jurisdiction (e.g., in the European Union (EU), some license plates identify both the EU and the member nation that issued the license plate; the geographical identifier may identify both of those places or just the member nation). The term "string of characters" may refer to a unique symbol issued by the jurisdiction to uniquely identify the vehicle, such as a "license plate number" (which may include numbers, letters, and symbols). That is, for each given jurisdiction, the string of characters is unique relative to other strings of characters issued by that given jurisdiction.

In order to train the second machine learning model, training examples of images of license plates are used, where the training examples are labeled. In an embodiment, the training examples are labeled with both the geographical jurisdiction and with characters that are depicted within the image. The characters may be individually labeled (e.g., by labeling segments of the image that include the segment), the whole image may be labeled with each character that is present, or a combination thereof. In an embodiment, the training examples may be labeled only with the geographical jurisdiction, and the second machine learning model predicts for a new image of a license plate the geographical jurisdiction. Following this prediction, a third machine learning model from a plurality of candidate machine learning models may be selected, each of the candidate machine learning models corresponding to a different geographical jurisdiction and trained to predict characters of the string of characters from training examples specific to its respective geographical jurisdiction, the selected third machine learning model selected based on the predicted geographical jurisdiction. The third machine learning model may be applied to the image or segments thereof that contain each character, thus resulting in a prediction from training examples specific to that jurisdiction.

In any case, the training examples may show examples in any number of conditions, from low lighting conditions, dirty license plate conditions where characters are partially or fully occluded, license plate frame conditions where geographical identifiers (e.g., the word "New York") are partially or fully occluded, license plate covers render characters hard to directly read, and so on. Advantageously, by using machine learning to predict geographical nomenclature and strings of characters, accuracy is improved relative to OCR, as even where partial occlusion occurs or lighting conditions make characters difficult to read, the second machine learning model is able to accurately predict the content of the license plate.

The trained second machine learning model may output the geographical nomenclature and string of characters (e.g., either directly, or with a confidence score that exceeds a threshold applied by entry detection module 212. With all information of the data set determined (e.g., the plurality of parameters and the vehicle identifier), edge device 110 may store or cause to be stored a data structure for the data set in association with one or more timestamps with the subset of images. In an embodiment, the data structure is stored at edge device 110. In an embodiment, the data structure is stored at parking control server 130. The data structure may include additional information, such as time stamps and/or sequence number of images in which the images featuring the respective vehicle appeared.

In a one-model approach, the manners of training the first and second machine learning model would be applied to a single model, rather than differentiating what is learned between the two models. This would result in an advantage of providing all inputs as one data set to a model, but could also result in a disadvantage of a less specialized model that has noisier output. Moreover, data and time intensive to train one large model to perform all of this functionality. The large model may be slower and have a lower quality of output than using two separate models. The two-model approach additionally allows for a "fail fast" processing to happen—that is, detect a vehicle and perform processing based on that detection, even before other activity (e.g., license plate reading) is completed.

Regardless of what model approach is used, in an embodiment, entry detection module 212 may determine, from direction attributes of the vehicle, whether the direction attributes are consistent with an entry motion. That is, where entry detection module 212 determines that a vehicle is approaching a gate (e.g., in an entry lane) with direction attributes consistent with that gate's function (e.g., using the entry lane as opposed to the exit lane), entry detection module 212 may determine that an entry motion has occurred. Responsive to detecting that an entry motion has occurred, entry detection module 212 may move the gate to enable entry to the facility that is blocked by the gate (or where the gate is a logical boundary, record that the vehicle has entered the facility without a need to move the gate). Also responsive to detecting that the entry motion has occurred, entry detection module 212 may store a data structure in an entry corresponding to the vehicle in a database. For example, this may be stored in entry data database 358, discussed in further detail below for use in matching an exit motion to an entry motion by a same vehicle. In an embodiment, further responsive to detecting that the entry motion has occurred, the data structure may also be stored in profile database 356 with reference to the vehicle or a user of the vehicle to record historical activity of that vehicle in entering facilities.

Exit detection module 214 operates in a manner similar to entry detection module 212, in that machine learning is applied in the same manner, except to detect an exit event. That is, a data set identical to that collected when a vehicle performs an entry motion is performed for an exit motion, where it is detected that a vehicle is approaching gate 114 to exit a facility. When an exit motion is detected (e.g., where a vehicle is determined to have directional attributes consistent with approaching a gate designated for use as an exit), exit detection module 214 determines that an exit event may have occurred (e.g., and other activity such as generation and storage of a data structure as described with respect to entry events may be performed).

Exit event module 216 compares the information of the data set obtained by exit detection module 214 to information stored in data structures of entry events and determines whether a match exists. Exit event module 216 determines a match where heuristics are satisfied, such a data structure indicating that a vehicle having a same geographical nomenclature entered the facility. Because license plate reading, even using the described second machine learning model, is not perfect, it may be the case that a match is not found by exit event module 216 of geographical nomenclature alone. To this end, a match may be determined based on other identifying information, such as identifying a partial match of a geographical nomenclature and/or other vehicle attributes that match such as make, model, color, and so on. Any heuristics may be programmed to determine whether or not a match has occurred. Responsive to detecting a match, exit event module 216 may instruct the data structure to be updated to indicate that a vehicle has exited the facility, and/or may raise gate 114 (e.g., where gate 114 is a physical gate rather than a logical boundary), thus allowing the vehicle to exit the facility.

Responsive to determining that there is no match, administrator alert module 218 may alert to an administrator, who may manually determine whether there is a match and/or communicate with a driver of the vehicle to take remedial action. In an embodiment, where there is no match, administrator alert module 218 may determine that the vehicle identifier is unknown. Responsive to determining that the vehicle identifier is unknown, administrator alert module 218 may transmit an alert to an administrator, the alert associated with at least a portion of the subset of images. That is, the alert may point to one or more images or portions that include identifying information (e.g., license plate, differentiating feature like a bumper sticker, and so on). Administrator alert module 218 may receive, from the administrator, input that specifies the vehicle identifier, and may use that input to find matching entry data. In some embodiments, administrator alert module 218 may alert an administrator as part of a remedial action (see remedial action module 230 for more details).

Sensor data receival module 220 receives sensor data from sensor 118, affixed to movable gate 114. Sensor data is data recorded by a sensor that provides information on the gate's functioning. For example, if the sensor is a 3-axis accelerometer, sensor data may include time correlated acceleration data that provides information on the gate's motion. In some embodiments, sensor 118 may contain a magnetically operated switch (e.g., a magnetic reed switch) that provides information about the gate's motion by changing state when in proximity to a magnet. Sensor data receival module 220 may receive sensor data by communicating with sensor 118 using a communication protocol, for example a Bluetooth or Bluetooth low energy (BLE) protocol. In some embodiments, sensor data receival module 220 may receive sensor data in consistent or aperiodic time intervals. In some embodiments, sensor data receival module 220 may start receiving sensor data from sensor 118 responsive to the sensor detecting gate movement. For example, sensor data receival module 220 may start receiving data responsive to detecting a change in acceleration over a threshold value or an acceleration value different from the acceleration value of the gate's closed position. The sensor data receival module 220 may stop receiving sensor data from sensor 118 responsive to detecting no movement for a period of time exceeding a threshold or responsive to exceeding a threshold period of time after the start of receiving data. By receiving data responsive to gate movement, the sensor data receival module 220 optimizes the power usage of the edge device 110 for sensor data transmissions. Sensor data receival module 220 may store the received data or may process the data as it is received (e.g., as part of a data stream).

Positional state determination module 222 determines a positional state of the moveable gate. The positional state may describe the position of the moveable gate, such as whether the gate is in an open position, closed position, or other. An open positional state refers to the state of the gate that allows vehicles to pass through, either entering or exiting the parking facility. For some gates, such as a pike that swings or raises up to open, the open state may be analogous to an up state. However, for a different gate, such as a pole or plurality of poles that lower into the ground to open, the open state may be analogous to a "down" state. The positional state of closed may similarly refer to a state of down or up depending on the gate type. For a gate that moves horizontally, the open and closed states may be associated with a left or right position of the gate. The "other" positional state refers to when the gate is neither in the open or closed position. One example of the other positional state may be when the gate is in between the open and closed states as part of the opening or closing process. Another example of the other positional state may be when the gate has exceeded the bounds of what positional state determination module 222 considers open or closed, such as if the gate has opened too far. For some gates, such as the pike gate, the positional state may describe the lateral position of the moveable gate, such as whether the gate is sitting in a normal position (i.e., has not moved laterally) or is in an ajar position (i.e., has moved laterally, for example after a vehicle crash). The positional state may be a discrete state (e.g., open or closed) or a continuous state (e.g., 45 degrees open, 45.1 degrees open, etc.), where the granularity of the continuous state depends on the sensor's resolution. Examples of the open, closed, other, normal, and ajar states are shown in FIG. 6.

Positional state determination module 222 determines the positional state of the gate based on the received sensor data. For example, responsive to the sensor data showing acceleration values close to zero, positional state determination module 222 may determine that the gate is in a closed state, the resting position for the gate. In another example in the case of a pike gate, responsive to the sensor data showing positive acceleration values exceeding a threshold acceleration value, positional state determination module 222 may determine that the gate has moved from the closed state up to an open state. Responsive to the sensor data showing negative acceleration values exceeding a threshold acceleration value followed by a default acceleration value (e.g., the acceleration due to gravity), positional state determination module 222 may determine that the gate has moved from the open state back down to the closed state.

In some embodiments, positional state determination module 222 may determine the positional state of the gate using a sensor containing a magnetically operated switch (e.g., sensor 118) and a magnet or plurality of magnets. The magnet and sensor 118 may be located to provide information about the position of the gate. For example, for a gate that is a pole moving up out of the ground and down into the ground, sensor 118 may be located at the top of the pole and the magnet may be located on the ground next to the pole. In this example, when the pole is in the open position (down into the ground), the magnetically operated switch on sensor

118 is near the magnet. Sensor 118 may register an electric current indicating that the gate is open, and positional state determination module 222 may determine that the positional state of the gate is open. Likewise, when the pole is in the closed position (up out of the ground), the magnetically operated switch on sensor 118 is far from the magnet. Sensor 118 may register a smaller (or zero) electric current indicating that the gate is closed. Positional state determination module 222 may determine that the positional state of the gate is closed. However, in some embodiments, using a sensor containing a magnetically operated switch and a magnet for positional state determination may only allow the positional state determination module 222 to register two states: open and closed.

In some embodiments, positional state determination module 222 may use camera 112 along with a machine learning model to determine the positional state of the gate without sensor 118. Positional state determination module 222 may train the machine learning model to receive camera data and output the positional state of the gate. Training data may include historical camera data from similar gates or the same gate, labelled using the positional state determined by a calibration process or by another labelling method, such as manual labelling or computer vision. However, in some embodiments, positional state determination module 222 may have limited access to camera data, for example when cameras are not facing the gate or when cameras are broken. In this case, positional determination module 222, through a calibration process or use of the machine learning model, may rely primarily on sensor data like acceleration data. Further, through relying on sensor data instead of directly on camera data, positional state determination module 222 may use less processing power to determine the state and may avoid issues associated with blocked fields of view from a camera.

Positional state determination module 222 may process the sensor data. Processing the sensor data may include filtering or smoothing the sensor data (e.g., with a moving average filter). Positional state determination module 222 may perform transformations on the sensor data, for example performing a fast Fourier transform (FFT) such that positional state determination module 222 may analyze the sensor data in the frequency domain instead of in the time domain. Positional state determination module 222 may use any signal processing or data filtering techniques. In the case where the sensor is an accelerometer, positional state determination module 222 may adjust the accelerometer values to account for acceleration caused by gravity.

In some embodiments, positional state determination module 222 may determine the positional state by comparing sensor data to stored values associated, through a calibration process, with a positional state. The calibration process may be performed by calibration module 224. In some embodiments, calibration module 224 may store an accelerometer value corresponding to the positional state of closed and an accelerometer value corresponding to the positional state of open. In some embodiments, calibration module 224 may determine that the positional state is closed responsive to determining that the acceleration of the gate is within a tolerance of the stored accelerometer value corresponding to the positional state of closed. Calibration module 224 may determine that the positional state is open responsive to determining that the acceleration of the gate is within a tolerance of the stored accelerometer value corresponding to the positional state of open. Calibration module 224 may determine that the positional state is other responsive to determining that the acceleration of the gate is not within the tolerance of the stored accelerometer value for either the open or closed states. In some embodiments where the sensor is a three-axis accelerometer, as part of the calibration process, calibration module 224 may store a threshold acceleration value along an axis perpendicular to the gate and parallel to a plane of a ground of the parking facility, store an indication that acceleration values below the threshold acceleration value correspond to a positional state of normal, and store an indication that acceleration values above the threshold acceleration value correspond to a positional state of ajar. In some embodiments, positional state determination module 222 may determine that the gate is in more than one state at once. For example, the gate may be in the closed state while simultaneously being in the normal state or may be in the closed state while simultaneously being in the ajar state.

In some embodiments, calibration module 224 may use data from a sensor containing a magnetically operated switch (e.g., sensor 118) and a magnet or plurality of magnets. The magnet and sensor 118 may be located to provide information about the position of the gate. Responsive to sensor 118 indicating that the gate is open, calibration module 224 may pair the accelerometer values received while the magnet data indicated that the gate was open with the positional state of open. Similarly, responsive to the magnet data indicating that the gate is closed, calibration module 224 may pair the accelerometer values received while the magnet data indicated that the gate was closed with the positional state of closed. An example of a magnet attachment on a pike gate is shown in FIG. 6.

In some embodiments, calibration module 224 may use data from a camera, such as camera 112. Responsive to the camera data indicating that the gate is closed, calibration module 224 may pair the accelerometer values received while the camera data indicated that the gate was closed with the positional state of closed. Similarly, responsive to camera data indicating that the gate is open, calibration module 224 may pair the accelerometer values received while the camera data indicated that the gate was open with the positional state of open.

In some embodiments, positional state determination module 222 may determine the positional state by using a supervised machine learning model trained to receive sensor data and output the positional state of the gate. Training data may include historical sensor data from similar gates or the same gate, labelled using the positional state determined by the calibration process or by another labelling method, such as computer vision. In the case where positional state determination module training data is labelled using computer vision, positional state determination module 222 may train the machine learning model using acceleration data from the sensor that can be correlated with a computer vision determination of the state based on timestamps in both datasets.

Positional state determination module 222 may store a log (e.g., in log data storage 232) that associates the sensor data with the determined positional state. A log may include sensor data such as accelerometer values, timestamps associated with the sensor data, and the determined state associated with the sensor data. In some embodiments, log data storage 232 is a cloud based storage system.

Health state determination module 226 determines a health state from one or more stored logs associated with the gate. Health state determination module 226 may determine the health state to be healthy or unhealthy. A healthy state indicates that the gate is exhibiting expected performance. For example, a gate exhibiting expected performance may move between open and closed states with speed within a tolerance, with continuous motion, or only responsive to instructions to move (e.g., the press of a button). An unhealthy state indicates that the gate is exhibiting performance outside of expected performance and may need maintenance. In some embodiments, health state determination module 226 may determine the health state to healthy or one of a set of unhealthy states. The set of unhealthy states may include positional states, such as the ajar positional state or staying in the other positional state for a time period exceeding a threshold time period. The set of unhealthy states may include states describing the behavior of the gate, such as opening too slowly, opening too quickly, moving inconsistently, wobbling, or crashed through. An "opening too slowly" health state may refer to the state of the gate in which, for a given time window, the average acceleration of the gate has decreased below a threshold acceleration value. Likewise, an "opening too quickly" health state may refer to the state of the gate in which, for a given time window, the average acceleration of the gate has increased above a threshold acceleration value. A health state of "moving inconsistently" may refer to the state of the gate in which the gate moves from the closed position to the open position (or vice versa) but does not do so with smooth motion or constant velocity. A "wobbling" health state may refer to the state of the gate in which the gate exhibits repetitive movement up and down (perpendicular to the ground), side to side (parallel to the ground), or some combination of the two directions. The wobbling health state may not always be an unhealthy state. Health state determination module 226 may determine that the health state is wobbling and is unhealthy if the amount of wobbling has exceeded a threshold value. Health state determination module 226 may measure the amount of wobbling as the displacement of the gate during each movement or the length of time that passes before the gate settles to a still position. In some embodiments, responsive to the displacement of the gate during wobbling exceeding a threshold value, health state determination module 226 may determine the health state of the gate to be "crashed through."

Health state determination module 226 may determine health state by observing changes in sensor data or positional state within a time window. For example, responsive to determining that the average acceleration of the gate has decreased below a threshold acceleration value within the time window (e.g., due to the lifespan of a motor controlling the gate's motion), health state determination module 226 may determine that the gate is opening too slowly and that the health state is unhealthy. Or responsive to determining that the gate is in a positional state of other for a proportion of the time window exceeding a threshold proportion, health state determination module 226 may determine that the health state is unhealthy. Likewise, responsive to determining that the positional state of the gate is ajar at any point within the time window, health state determination module 226 may determine that the health state is unhealthy. In some embodiments, health state determination module 226 may determine the health state on a cloud computing environment.

In some embodiments, health state determination module 226 may determine the health state using a machine learning model. The machine learning model may be a supervised model that is trained using existing logs to predict, for new logs, the health state of the gate. The existing logs may include sensor data, positional state, and time data. The logs may be annotated with gate attributes such as location and type (e.g., exit gate, entry gate). The logs may be labeled with health state (e.g., opening too slowly, opening too quickly, moving inconsistently, wobbling, crashed through, ajar, or staying in the other positional state for too long) or with a level of urgency associated with the gate's condition (e.g., urgent may be applied to a crashed through gate and non-urgent may be applied to a gate opening too slowly).

In some embodiments, health state determination module 226 may train the machine learning model to classify the state of the gate less granularly, for example classifying the state as either healthy or unhealthy or classifying the state as healthy, unhealthy-non-urgent, or unhealthy-urgent.

In some embodiments, the machine learning model may be a generic classifier that maps positional states directly to health state (e.g., a positional state of crashed through maps to unhealthy) or maps normalized sensor data to health state. In some embodiments, the machine learning model is specific to gate type. A first model trained to determine gate type using data from camera 112 may determine the gate type of the gate and then feed one or more entries to a second machine learning model corresponding to the gate type. Health state determination module 226 may determine health state by inputting one or more logs into the machine learning model and receiving, as output from the model, the health state.

Remedial action module 230 triggers a remedial action responsive to the health state determination module 226 determining that the health state is unhealthy. In an embodiment, the remedial action is an alert transmitted to an operator or the administrator (e.g., using administrator alert module 218). An alert may be any form of communication that lets an operator know the gate's health state. Examples of alerts may be an automated message sent as a phone call, text, or push notification to the mobile device of the operator, an email message sent to the email address of the operator, an alert within the vicinity of the gate, such as a message broadcasted through a speaker, or a visual alert such as a light on the gate itself. Remedial action module 230 may, based on information about the gate (e.g., gate location, health state, or health state of gates in the same parking facility) or based on other heuristics (e.g., time of day, operator work schedule), determine who to alert or prompt for repairs and a level of urgency to convey. For example, responsive to determining that the health state is crashed through, edge device 110 may contact the operator of the parking facility and convey high urgency. In a similar example, responsive to determining that the health state is unhealthy and that the gate is blocking a main entrance/exit to a parking facility during peak hours, edge device 110 may contact the operator of the parking facility and convey high urgency. In an alternative example, responsive to determining that the health state is unhealthy, but that there is an additional gate with health state of healthy that provides the same functionality as the gate with health state of unhealthy, remedial action module 230 may contact the operator of the parking facility and convey a smaller amount of urgency.

In an embodiment, the remedial action includes modifying a physical aspect of the parking facility. For example, remedial action module 230 may send a notification to parking control server 130 to change a status light above the parking gate to indicate that it is closed. In some embodiments, the remedial action includes transmitting a communication to drivers (e.g., drivers in or nearby the parking facility) to use a different gate (e.g., through a mobile application, SMS or push notifications).

In an embodiment, edge device 110 applies computer vision to determine environmental factors around the vehicle. The term environmental factors, as used herein, may refer to features that influence traffic flow in the vicinity of gate 114, such as street traffic blocking egress from a facility, orientation of vehicles within images with respect to one another, and so on. In an embodiment, when instructing the moveable gate to move, edge device 110 applies parameters based on the determined environmental factors (e.g., wait to open gate 114 despite matching an exit to an entry due to a vehicle being ahead of the vehicle attempting to exit and therefore blocking egress).

Figure 3:
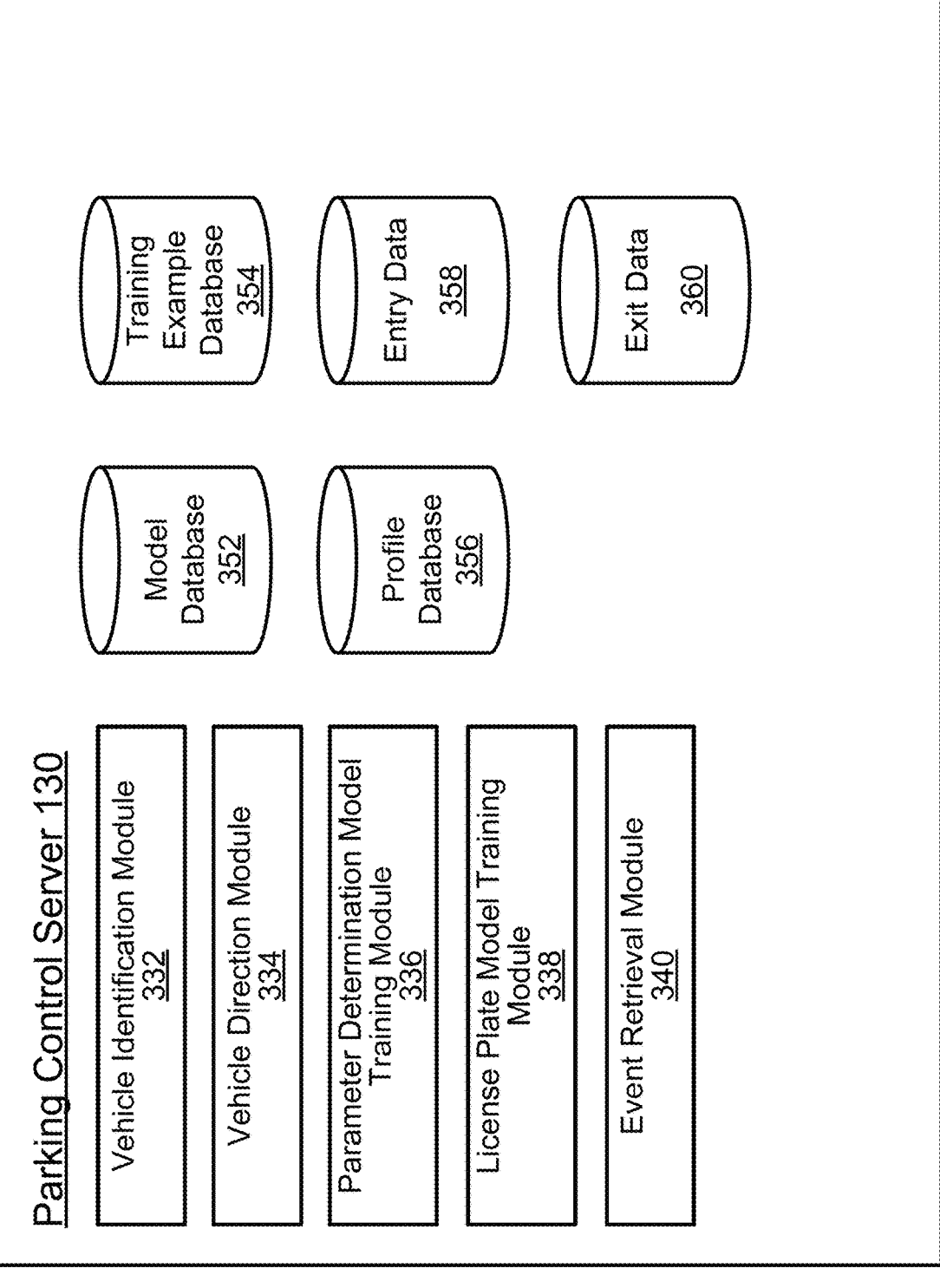
FIG. 3 illustrates one embodiment of exemplary modules operated by a parking control server.

FIG. 3 illustrates one embodiment of exemplary modules operated by a parking control server. As depicted in FIG. 3, parking control server 130 includes vehicle identification module 332, vehicle direction module 334, parameter determination model training module 336, license plate model training module 338, event retrieval module 340, model database 352, profile database 356, training example database 354, entry data 358, and exit data 360. The modules and databases depicted in FIG. 3 are merely exemplary, and fewer or more modules and/or databases may be used to achieve the activity that is disclosed herein. Moreover, the modules and databases, though depicted in parking control server 130, may be distributed, in whole or in part, to edge device 110, which may perform, in whole or in part, any activity described with respect to parking control server 130. Yet further, the modules and databases may be maintained separate from any entity depicted in FIG. 1 (e.g., determination model training module 336 and license plate training module 338 may be housed entirely offline or in a separate entity from parking control server 130).

Vehicle identification module 332 identifies a vehicle using the first machine learning model described with respect to entry detection module 212. In particular, vehicle identification module 332 accesses the first machine learning model from model database 352, and applies input images and/or any other data to the machine learning model, receiving parameters of the vehicle therefrom. Vehicle identification module 332 acts in the scenario where images are transmitted to parking control server 130 for processing, rather than being processed by edge device 110. Similarly, vehicle direction module 334 determines a direction of a vehicle within images captured at edge device 110 by cameras 112 in the manner described above with respect to entry detection module 212, except by using images and/or other data received at parking control server 130 as input, rather than being processed by edge device 110.

Parameter determination model training module 336 trains the first machine learning model to predict parameters of vehicles in the manner described above with respect to entry detection module 212. Parameter determination model training module may additionally train the first machine learning model to predict direction of a vehicle. Parameter determination model training module may access training examples from training example database 354 and may store the models at model database 352. Similarly, license plate model training module 338 may train the second machine learning model using training examples stored at training example database 354 and may store the trained model at model database 352.

Event retrieval module 340 receives instructions from exit event module 216 to retrieve entry data from entry data database 358 that matches detected exit data, and returns at least partially matching data and/or a decision as to whether a match is found to exit event module 216. Event retrieval module 340 optionally stores the exit data to exit data database 360.

Profile database 356 stores profile data for vehicles that are encountered. For example, identifying information and/ or license plate information may be used to index profile database 356. As a vehicle enters and exits facilities, profile database 356 may be populated with profiles for each vehicle that store those entry and exit events. Profiles may indicate owners and/or drivers of vehicles and may indicate contact information for those users. Event retrieval module 340 may retrieve contact information when an event is detected and may initiate communications with the user (e.g., welcome to parking facility message, or other information relating to usage of the facility).

Figure 4:
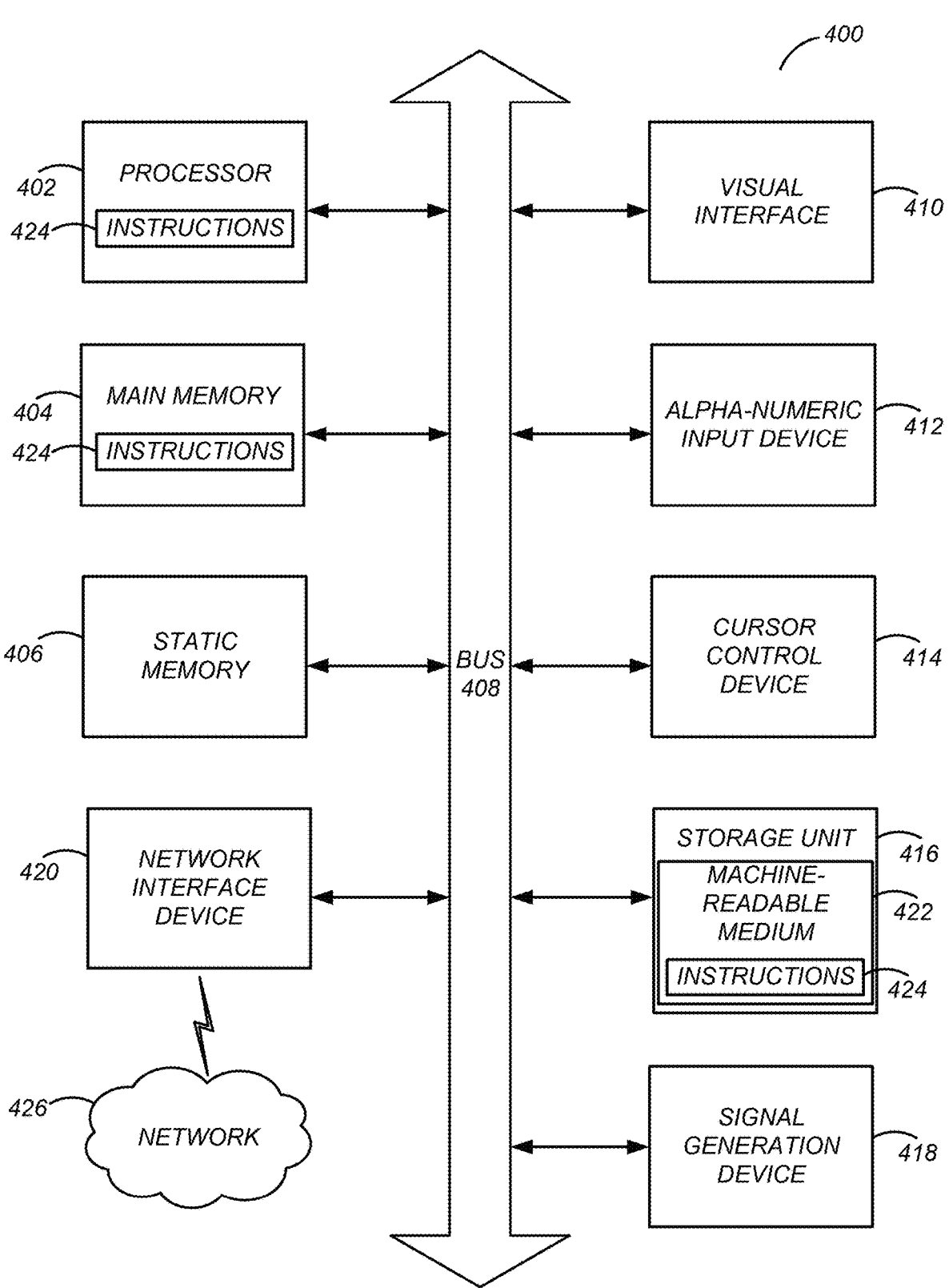
FIG. 4 is a block diagram illustrating components of an example machine able to read instructions from a machine-readable medium and execute them in a processor (or controller).

FIG. 4 is a block diagram illustrating components of an example machine able to read instructions from a machine-readable medium and execute them in a processor (or controller). FIG. (FIG. 4 is a block diagram illustrating components of an example machine able to read instructions from a machine-readable medium and execute them in a processor (or controller). Specifically, FIG. 4 shows a diagrammatic representation of a machine in the example form of a computer system 400 within which program code (e.g., software) for causing the machine to perform any one or more of the methodologies discussed herein may be executed. The program code may be comprised of instructions 424 executable by one or more processors 402. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes one or more processors 402 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 404, and a static memory 406, which are configured to communicate with each other via a bus 408. The computer system 400 may further include visual display interface 410. The visual interface may include a software driver that enables (or provide) user interfaces to render on a screen either directly or indirectly. The visual interface 410 may interface with a touch enabled screen. The computer system 400 may also include input devices 412 (e.g., a keyboard a mouse), a cursor control device 414, a storage unit 416, a signal generation device 418 (e.g., a microphone and/or speaker), and a network interface device 420, which also are configured to communicate via the bus 408.

The storage unit 416 includes a machine-readable medium 422 (e.g., magnetic disk or solid-state memory) on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution.

Figure 5:
FIG. 5 depicts one embodiment of an exemplary process for determining gate state and remedial measures using a sensor attachment.

FIG. 5 is a flowchart for a method of determining the state of a gate using a sensor attachment, in accordance with some embodiments. Alternative embodiments may include more, fewer, or different steps from those illustrated in FIG. 5, and the steps may be performed in a different order from that illustrated in FIG. 5. In some embodiments, the steps of the method may be performed by a server, such as parking control server 130.

Edge device 110 receives 510 sensor data from a sensor affixed to a moveable gate (e.g., using sensor data receival module 220). Sensor data may be data from an accelerometer (acceleration data). Edge device 110 may receive the sensor data from sensor 118 affixed to gate 114 over Bluetooth communication, such as with a BLE protocol.

Edge device 110 determines 520 a positional state of the moveable gate based on the received sensor data (e.g., using positional state determination module 222). Edge device 110 may determine the positional state by comparing sensor data to values associated with a positional state through a calibration process (e.g., using calibration module 224). The calibration process may use data from camera 112 or a magnet. Edge device 110 may determine the positional state by using a supervised machine learning model trained to receive sensor data and output the positional state of the gate.

Edge device 110 stores 530 a log that associates the sensor data with the determined positional state (e.g., using positional state determination module 222 and log data storage 232).

Edge device 110 determines 540 a health state from one or more stored logs associated with the gate by observing changes in sensor data or positional state within a time window or by using a machine learning model, such as a supervised model trained using existing logs to predict, for new logs, the health state (e.g., using health state determination module 226). Edge device 110 determines 550 whether the health state is unhealthy (e.g., using health state determination module 226).

Responsive to determining health state is unhealthy, edge device 110 triggers 560 a remedial action (e.g., using remedial action module 230), which may include alerting an operator or administrator or modifying an aspect of the parking facility.

Figure 6A:
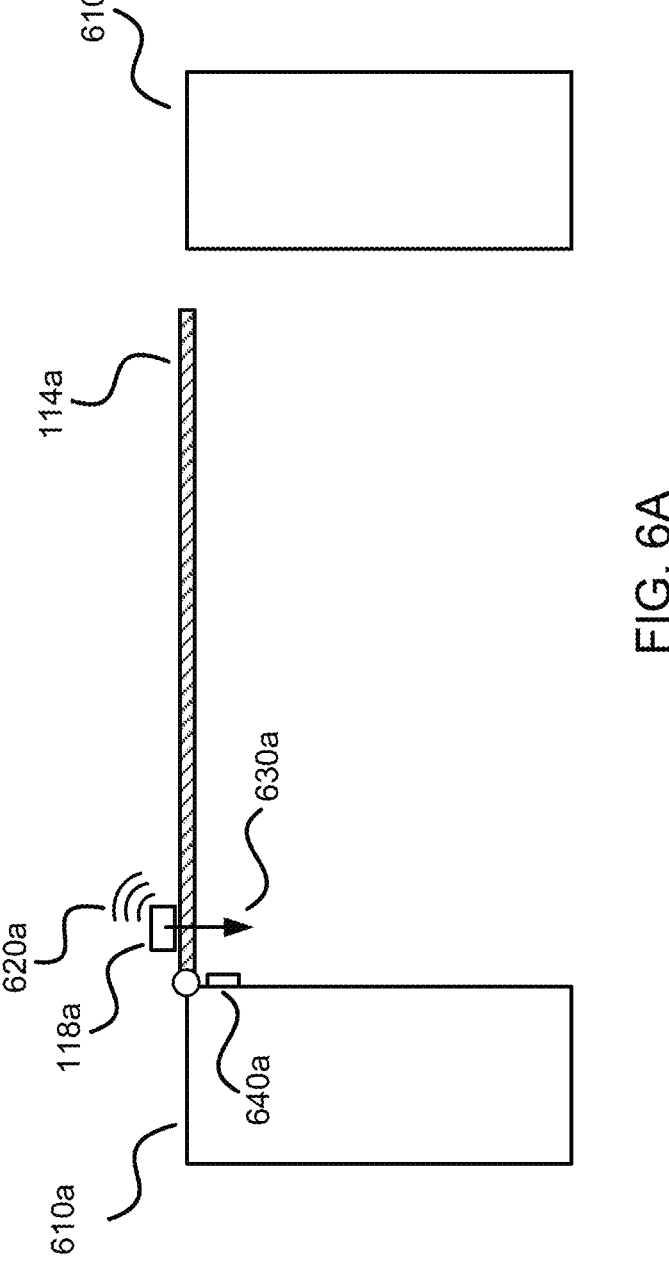
FIGS. 6A-E illustrate an example gate in different positional states.

FIGS. 6A-E illustrate an example gate in different positional states. Each figure depicts a pike style gate 114 that blocks the path between two barriers 610. Gate 114 is affixed to one of the barriers 610 at one end and can rotate about the point at which it is attached. In some embodiments, only the barrier 610 to which the gate is affixed may be present. Attached to gate 114 is sensor 118. The figures show sensor 118 attached to the end of gate 114 close to the point of rotation, however sensor 118 may be attached anywhere on gate 114. Sensor 118 may broadcast signal 620 to communicate sensor data to edge device 110 (not shown). Shown on sensor 118 is acceleration vector 630 which points in the direction of acceleration due to gravity. Magnet 640 is shown attached to the side of one of the barriers 610 such that sensor 118 is close to magnet 640 when the gate is in a closed position (FIG. 6A).

FIG. 6A illustrates gate 114a in a closed position. In this position, gate 114a is lowered and blocks entry or exit between barriers 610a. Acceleration vector 630a forms a 90 degree angle (i.e., is perpendicular) with gate 114a. Magnet 640a is close to sensor 118a and may generate an electric current.

Figure 6B:
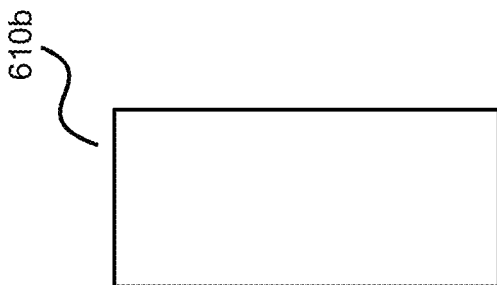
Figure 6B:
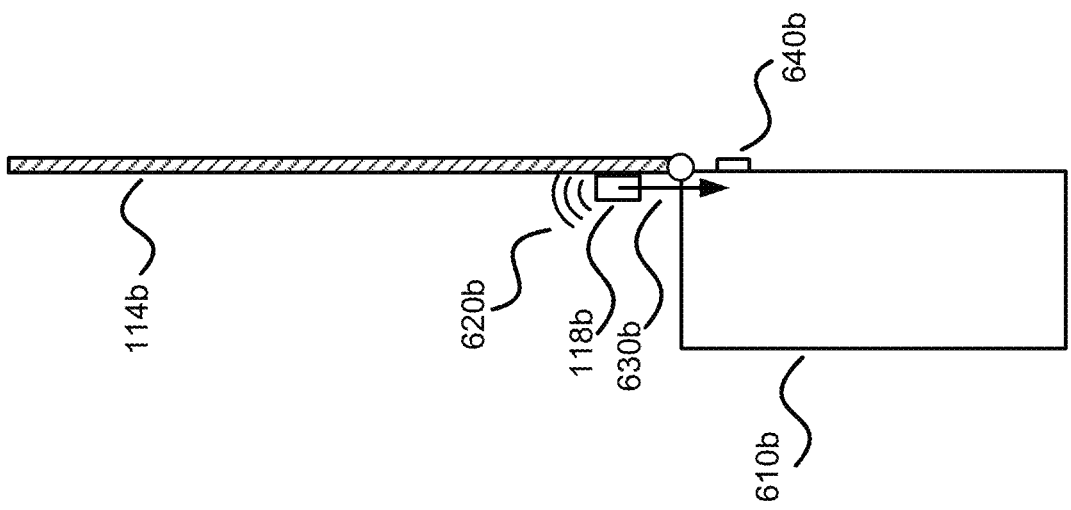

FIG. 6B illustrates gate 114b in an open position. In this position, gate 114b is raised such that a vehicle may pass through barriers 610b. Acceleration vector 630b forms a zero degree angle (i.e., is parallel) with gate 114b. Magnet 640b is far from sensor 118b and may generate less of an electric current than the electric current generated while gate 114$b$ was in the closed position (FIG. 6A).

Figure 6C:
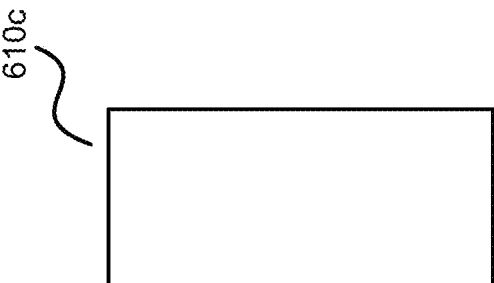
Figure 6C:
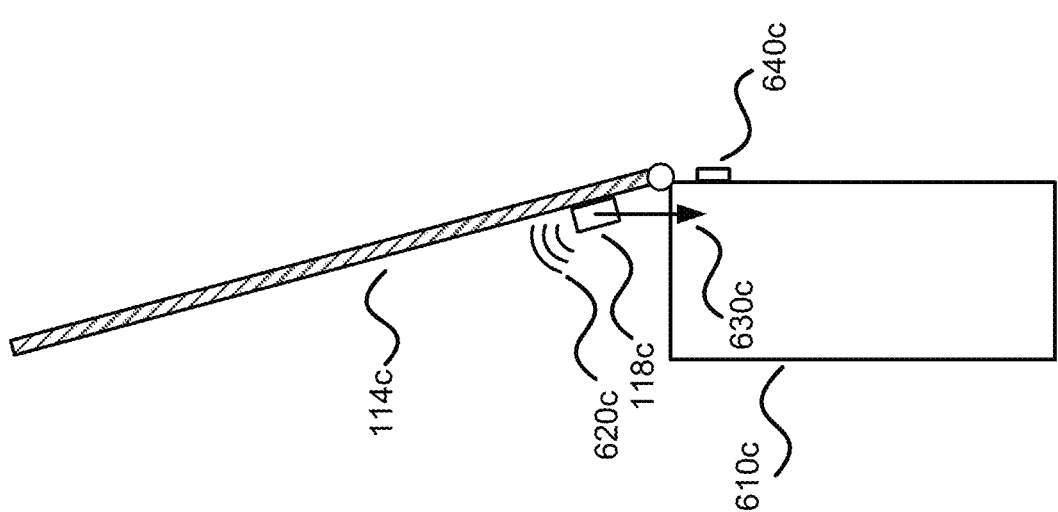

FIG. 6C illustrates gate 114$c$ in an other position. In this example, gate 114$c$ is in the other position because its position has exceeded the bounds of what positional state determination module 222 considers to be open. Namely, gate 114$c$ has rotated too far past the open position. In another example, gate 114$c$ may be in the other position if gate 114$c$ is in between an open position and a closed position or when gate 114$c$ has rotated too far past the closed position. Acceleration vector 630$c$ forms an acute angle with gate 114$c$. Magnet 640$c$ is far from sensor 118$c$ and may generate less of an electric current than the electric current generated while gate 114$c$ was in the closed position (FIG. 6A).

Figure 6D:
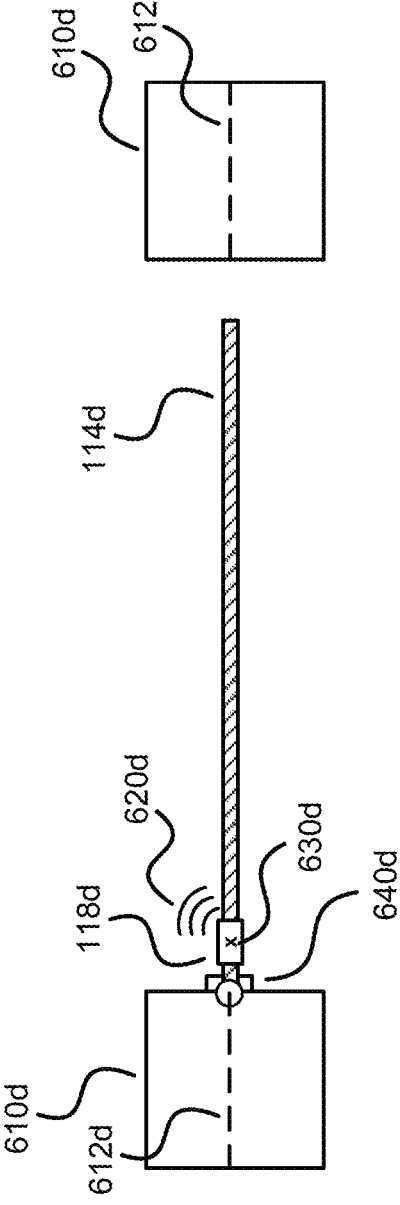

FIG. 6D is shown from the perspective of looking down at the gate from above while the gate is in the closed position. FIG. 6D illustrates gate 114$d$ in the normal lateral position. The angle of gate 114$d$ is parallel with the horizontal center lines 612$d$ of barriers 610$d$. Acceleration vector 630$d$ is shown as an "x" indicating its direction into the page. As gate 114$d$ is in the closed position, acceleration vector 630$d$ forms a 90 degree angle with horizontal center lines 612$d$. As gate 114$d$ is in the closed position, magnet 640$d$ is close to sensor 118$d$ and may generate a magnetic force.

Figure 6E:
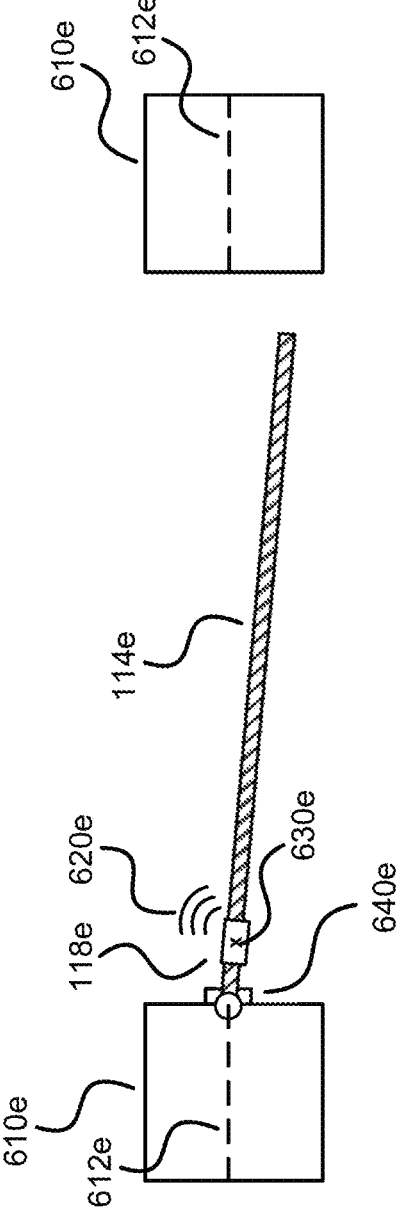

FIG. 6E is shown from the perspective of looking down at the gate from above while the gate is in the closed position. FIG. 6E illustrates gate 114$e$ in the ajar lateral position. Gate 114$e$ forms an angle with the horizontal center lines 612$e$ of barriers 610$e$. Acceleration vector 630$e$ is shown as an "x" indicating its direction into the page. As gate 114$e$ is in the closed position, acceleration vector 630$e$ forms a 90 degree angle with horizontal center lines 612$e$. Although gate 114$e$ is in the closed position, because the lateral position of the gate is ajar, magnet 640$e$ is no longer close to sensor 118$e$ and may generate less of an electric current than the electric current generated while gate 114$e$ was closed and in the normal position.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium and processor executable) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

Upon reading this disclosure, those of skill in the art will appreciate still additional alternative structural and functional designs for a system and a process for seamless entry and exit to a parking facility blocked by a moveable gate through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
receiving, at an edge device within a threshold proximity of a parking facility, sensor data from a sensor affixed to a moveable gate forming a barrier to vehicles with respect to the parking facility;
storing, by the edge device, an association between the sensor data and a positional state of the moveable gate;
determining a health state of the moveable gate based on a set of positional state data, the set of positional state data comprising the associated positional state;
determining whether the health state is unhealthy; and
responsive to determining that the health state is unhealthy, triggering a remedial action.

2. The method of claim 1, wherein the sensor data is received responsive to movement of the moveable gate.

3. The method of claim 1, further comprising calibrating the edge device to translate given sensor data to a candidate positional state of a plurality of candidate positional states.

4. The method of claim 3, wherein the sensor is an accelerometer, and wherein calibrating the edge device comprises:
storing, to the edge device, a first accelerometer value corresponding to a positional state of closed; and
storing, to the edge device, a second accelerometer value corresponding to a positional state of open.

5. The method of claim 4, wherein a tolerance is defined relative to the first accelerometer value within which the positional state of closed is determined, and outside of which a positional state of unknown is determined.

6. The method of claim 4, wherein the accelerometer is a three-axis accelerometer, and wherein calibrating the edge device further comprises:
storing, to the edge device, a threshold force value along an axis perpendicular to the moveable gate and parallel to a plane of a ground of the parking facility;
storing, to the edge device, an indication that force values below the threshold force value correspond to a positional state of wobble; and
storing, to the edge device, an indication that force values above the threshold force value correspond to a positional state of crashed through.

7. The method of claim 4, further comprising:
determining the positional state using camera data; and
pairing the determined positional state with an accelerometer value received while the camera data indicated that the moveable gate was in the determined positional state.

8. The method of claim 4, further comprising:
determining the positional state using magnet data; and
pairing the determined positional state with an accelerometer value received while the magnet data indicated that the moveable gate was in the determined positional state.

9. The method of claim 1, wherein determining the health state of the moveable gate based on the set of positional state data comprises:
inputting the set of positional state data into a supervised machine learning model; and receiving, as output from the supervised machine learning model, the health state.

10. The method of claim 9, wherein the supervised machine learning model was trained using positional state data and time data, annotated with attributes of the moveable gate, and labeled with health state, wherein health state is determined by comparing an accelerometer value of the moveable gate within a time window to a threshold.

11. The method of claim 9, wherein the supervised machine learning model is trained to output health state for a particular type of moveable gate.

12. The method of claim 1, wherein determining the health state of the moveable gate based on the set of positional state data comprises:
inputting the positional state into a classifier; and
receiving, as output from the classifier, the health state.

13. The method of claim 1, further comprising determining the positional state of the moveable gate based on the sensor data.

14. The method of claim 13, wherein determining the positional state of the moveable gate based on the sensor data comprises:
inputting the sensor data into a supervised machine learning model; and
receiving, as output from the supervised machine learning model, the positional state.

15. The method of claim 14, wherein the supervised machine learning model was trained using historical sensor data from the moveable gate, labeled with positional state, wherein positional state is determined by a calibration process.

16. The method of claim 1, wherein the association between the sensor data and the positional state of the moveable gate is stored in a log.

17. The method of claim 16, wherein determining the health state of the moveable gate based on the set of positional state data comprises determining the health state of the moveable gate from a sequence of entries in the log.

18. The method of claim 1, wherein the remedial action comprises an alert prompt to a technician for immediate redress responsive to determining that the health state of the moveable gate is crashed through.

19. A non-transitory computer-readable medium comprising memory with instructions encoded thereon, the instructions, when executed by one or more processors, causing the one or more processors to perform operations, the instructions comprising instructions to:
receive, at an edge device within a threshold proximity of a parking facility, sensor data from a sensor affixed to a moveable gate forming a barrier to vehicles with respect to the parking facility;
store, by the edge device, an association between the sensor data and a positional state of the moveable gate;
determine a health state of the moveable gate based on a set of positional state data, the set of positional state data comprising the associated positional state;
determine whether the health state is unhealthy; and
responsive to a determination that the health state is unhealthy, trigger a remedial action.

20. A system comprising:
memory with instructions encoded thereon; and
one or more processors that, when executing the instructions, are caused to perform operations comprising:
receiving, at an edge device within a threshold proximity of a parking facility, sensor data from a sensor affixed to a moveable gate forming a barrier to vehicles with respect to the parking facility;

storing, by the edge device, an association between the sensor data and a positional state of the moveable gate;

determining a health state of the moveable gate based on a set of positional state data, the set of positional state data comprising the associated positional state;

determining whether the health state is unhealthy; and responsive to determining that the health state is unhealthy, triggering a remedial action.

\* \* \* \* \*